United States Patent
Magielse et al.

(10) Patent No.: US 12,430,451 B2
(45) Date of Patent: Sep. 30, 2025

(54) NETWORK CONTROLLER FOR GRANTING ACCESS RIGHTS TO A SET OF DEVICES

(71) Applicant: SIGNIFY HOLDING B.V., Eindhoven (NL)

(72) Inventors: Remco Magielse, Tilburg (NL); Dzmitry Viktorovich Aliakseyeu, Eindhoven (NL); Tobias Georg Tolle, Beerse (BE); Paolo Sabatinelli, Eindhoven (NL); Huon Urbald Ogier Norbert Van De Laarschot, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 119 days.

(21) Appl. No.: 17/790,551

(22) PCT Filed: Dec. 21, 2020

(86) PCT No.: PCT/EP2020/087427
§ 371 (c)(1),
(2) Date: Jul. 1, 2022

(87) PCT Pub. No.: WO2021/136706
PCT Pub. Date: Jul. 8, 2021

(65) Prior Publication Data
US 2023/0041609 A1  Feb. 9, 2023

(30) Foreign Application Priority Data

Jan. 2, 2020 (EP) .................................... 20150018

(51) Int. Cl.
H04L 29/06 (2006.01)
G06F 21/60 (2013.01)
H04L 9/40 (2022.01)

(52) U.S. Cl.
CPC .......... *G06F 21/604* (2013.01); *H04L 63/101* (2013.01)

(58) Field of Classification Search
CPC .............................. G06F 21/604; H04L 63/101
See application file for complete search history.

(56) References Cited

U.S. PATENT DOCUMENTS 7,260,616 B1  8/2007  Cook
8,831,567 B2  9/2014  Kim et al.
(Continued)

FOREIGN PATENT DOCUMENTS

EP  2665237 A1 * 11/2013  ........... H04L 63/107
EP  2741465 A1  6/2014

*Primary Examiner* — Jason K Gee

(57) ABSTRACT

A network controller (102) for granting a device and/or an application (120) access rights to at least one device of a set of devices (112, 130) is disclosed. The set of devices (112, 130) comprises a controllable device (130) and a control device (110), wherein the control device (110) comprises a user input element (112) configured to receive a user input, and wherein the control device (110) is configured to generate an input signal (114) based on the received user input. The network controller (102) comprises a communication unit (104) configured to receive an access request signal (124) from the device and/or the application (120), and to receive the input signal (114) from the control device (110), and a processor (106) configured to switch, upon receipt of the access request signal (124), the network controller (102) from a control mode to a configuration mode, wherein the processor (106) is configured to control, if the network controller (102) is in the control mode, the controllable device (130) based on the input signal (114), wherein the processor (106) is configured to grant, if the network controller (102) is in the configuration mode, the access rights to the device and/or the application (120) upon receipt of the input signal (114).

15 Claims, 4 Drawing Sheets

(56) References Cited

U.S. PATENT DOCUMENTS

| | | |
|---|---|---|
| 10,091,862 B2 | 10/2018 | Verbrugh et al. |
| 2010/0154051 A1* | 6/2010 | Bauer .................. G06F 9/45533 700/1 |
| 2011/0126271 A1* | 5/2011 | Kim .................... H04W 12/062 726/4 |
| 2014/0373090 A1 | 12/2014 | Murgia et al. |
| 2019/0141823 A1 | 5/2019 | Mason et al. |
| 2019/0288554 A1 | 9/2019 | Baker et al. |

* cited by examiner

US 12,430,451 B2

NETWORK CONTROLLER FOR GRANTING ACCESS RIGHTS TO A SET OF DEVICES

CROSS-REFERENCE TO PRIOR APPLICATIONS

This application is the U.S. National Phase application under 35 U.S.C. § 371 of International Application No. PCT/EP2020/087427, filed on Dec. 21, 2020, which claims the benefit of European Patent Application No. 20150018.8, filed on Jan. 2, 2020. These applications are hereby incorporated by reference herein.

FIELD OF THE INVENTION

The invention relates to a network controller for granting a device and/or an application access rights to at least one device of a set of devices. The invention further relates to a control system comprising the network controller, a control device and a controllable device.

The invention further relates to a method for granting a device and/or a software application access rights to at least one device of a set of devices, and to a computer program product for executing the method.

BACKGROUND

Connected home and office systems enable users to control controllable devices such as lamps, entertainment systems, heating systems, etc. with one or more controllable devices such as smartphones, switches, remote control devices and other control devices. In some systems, if a user wishes to add a new device to the network of devices, or if the user wishes to grant an application access to the network of devices, the user is requested to physically press a button on a central network controller. The central network controller may, for example, be a central (home) controller, a bridge, a router, etc. Upon receiving the physical input of the user, the new device or application is provided access to the network of devices. As a result, (remote) applications or devices are unable to join the network of devices if the user does not provide the physical input. By ascertaining that the user is physically present at the network of devices, the security of the system is increased.

EP 2665237 A1 discloses to receive an input from a user of a host device via a user interface to grant access rights to the wireless short-range communication network managed by the access point when the host device is present within coverage of the wireless short-range communication network.

SUMMARY OF THE INVENTION

The inventors have realized that in many cases it is cumbersome to provide the physical user input. Typically, the central network controller (e.g. a router or a bridge) is located at a location that is difficult to be access and hidden from sight (e.g. in/on top of a cabinet, inside the meter cupboard, in the basement, etc.). Hence, it may be cumbersome to provide the physical user input. It therefore an object of the present invention to provide an improved and user-friendly way to grant a new device or software application access rights to a network of devices.

According to a first aspect of the present invention, the object is achieved by a network controller for granting a device and/or an application access rights to at least one of a set of devices, wherein the set of devices comprises a controllable device and a control device, wherein the control device comprises a user input element configured to receive a user input, and wherein the control device is configured to generate an input signal based on the received user input, wherein the network controller comprises:
- a communication unit configured to receive an access request signal from the device and/or the application, and to receive the input signal from the control device, and
- a processor configured to switch, upon receipt of the access request signal, the network controller from a control mode to a configuration mode,
wherein the processor is configured to control, if the network controller is in the control mode, the controllable device based on the input signal,
wherein the processor is configured to grant, if the network controller is in the configuration mode, the access rights to the device and/or the application upon receipt of the input signal.

The network controller (e.g. a bridge, a central home control system, a router, a gateway, etc.) receives an access request signal from the device and/or the software application. The network controller is further configured to receive the input signal from the control device (e.g. a switch), based on the user input received via the user input element (e.g. a button). The processor of the network controller is further configured to switch, upon receipt of the access request signal, the network controller from a control mode to a configuration mode. When the network controller is in the control mode, the controllable device (e.g. a lighting unit) is controlled based on the input signal, and when the network controller is in the configuration mode, the processor provides the access rights to the device and/or the application upon receipt of the input signal. As such, the control device has a double function: it can be used to control the controllable device based on a (physical) user input, and it can be used to provide access rights to a new device and/or application. Therefore, the user does not have to provide a physical user input at the network controller. Instead, the user can provide the (physical) user input at the control device (e.g. a light switch), whereupon the access rights are granted. Such control devices are typically located at locations that are more accessible compared to the network controller. Thus, an improved and user-friendly way to grant a new device or application access rights to a network of devices is provided.

The access rights provide access to one or more devices of the set of devices. The access rights may provide access to control and/or configuration of at least one device of the set of devices. The access rights may, for example, provide access to control and/or configuration of the controllable device, or access to control and/or configuration of another controllable device of the set of devices. This enables the device and/or the application to control and/or configure the controllable device. Additionally or alternatively, the access rights may, for example, provide access to the control device, or access to another control device of the set of devices. This enables the device and/or the application to, for example, configure the control device.

The network controller may comprise a second user interface configured to receive a second user input, and the network controller may be configured to grant the device and/or the application the access rights upon receiving the second user input. The network controller may comprise a second user interface (e.g. a button) via which the user may grant the access rights to the new device and/or application.

The processor may be further configured to transmit, when the network controller is in the control mode, a control command to the controllable device based on the input signal.

The processor may be configured to switch back to the control mode after a predetermined period of time. This enables the user to provide the user input to grant the access rights within the predetermined period of time.

The processor may be further configured to switch the network controller back to the control mode after the input signal has been received, or after the access rights have been granted. This enables the user to use the control device in the 'normal' mode, wherein the controllable device is controlled based on the user input.

The processor may be further configured to communicate a response signal to the device and/or the application, wherein the response signal comprises information indicative of that the access rights have been granted. The processor may communicate the response signal via the communication unit. This enables the processor to inform the new device that access rights have been granted. Alternatively, no response signal is communicated, and the access rights are granted.

The processor may be further configured to access a memory configured to store access data indicative of access rights of devices and applications, and the processor may be configured to grant the access rights to the device and/or the application by updating the access data in the memory. The memory may be located in the network controller, or remote from the network controller and be accessible via a network and/or via the internet. By updating the access rights for the new device and/or the application in the memory, the access rights are granted.

The control device may comprise a further user input element configured to receive a further user input, and the control device may be configured to generate a further input signal based on the received further user input, and the communication unit may be configured to receive the further input signal. The processor may be configured to control, if the network controller is in the control mode, the controllable device based on the further input signal, and the processor may be configured to grant, if the network controller is in the configuration mode, the access rights to the device and/or the application when the further input signal has been received. Thus, if the control device comprises multiple user input elements, it does not matter whether the user provides a user input via the user input element or via the further user input element to grant the access rights to the new device.

The set of devices may comprise a plurality of control devices, and the processor may be configured to obtain information indicative of locations of the plurality of control devices relative to a location of a user requesting the access rights for the device and/or the application. The processor may be configured to switch to the configuration mode for input signals received from a first control device and to stay in the operation mode for input signals received from a second control device based on the locations of the first and second control devices relative to the location of the user. The processor may, for example, be configured to select a control device from the plurality of control devices that is in closest proximity of the user. When a user has multiple control devices (e.g. remote control devices, (light) switches, etc.), it may be beneficial to select a proximate control device for which the network controller switches to the configuration mode. This increases the usability of the system, and it enables another user (who is not trying to obtain access rights for the control device and/or the application) to use the other control device for controlling the/another controllable device.

The controllable device may be a lighting device, and the application may be a lighting control application. Additionally or alternatively, the control device may be a light switch, and the controllable device may comprise a light source configured to be controlled based on the user input received via the user input element of the control device.

According to a second aspect of the present invention, the object is achieved by a control system comprising:
the network controller of any preceding claim,
the control device comprising the user input element configured to receive the user input, and
the controllable device configured to be controlled based on the input signal.

According to a third aspect of the present invention, the object is achieved by a method for granting a device and/or an application access rights to at least one device of a set of devices via a network controller, wherein the set of devices comprises a controllable device and a control device, wherein the control device comprises a user input element configured to receive a user input, and wherein the control device is configured to generate an input signal based on the received user input, wherein the method comprises:
receiving an access request signal from the device and/or the application,
receiving the input signal from the control device, and
switching, upon receipt of the access request signal, the network controller from a control mode to a configuration mode,
controlling, if the network controller is in the control mode, the controllable device based on the input signal, and
granting, if the network controller is in the configuration mode, the access rights to the device and/or the application upon receipt of the input signal.

The method may further comprise rendering, via a user interface, a notification to indicate that the access rights have been granted to the device and/or the application. It may be beneficial to notify a user that the access rights have been granted.

The method may further comprise rendering, via a user interface, a notification to notify a user that the control device is set to receive the user input for obtaining the access rights. It may be beneficial to notify a user that the control device is ready to receive the user input for granting the access rights.

According to a fourth aspect of the present invention, the object is achieved by a computer program product for a computing device, the computer program product comprising computer program code to perform any of the methods when the computer program product is run on a processing unit of the computing device.

It should be understood that the control system, the method and the computer program product may have similar and/or identical embodiments and advantages as the above-mentioned control system, and vice versa.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
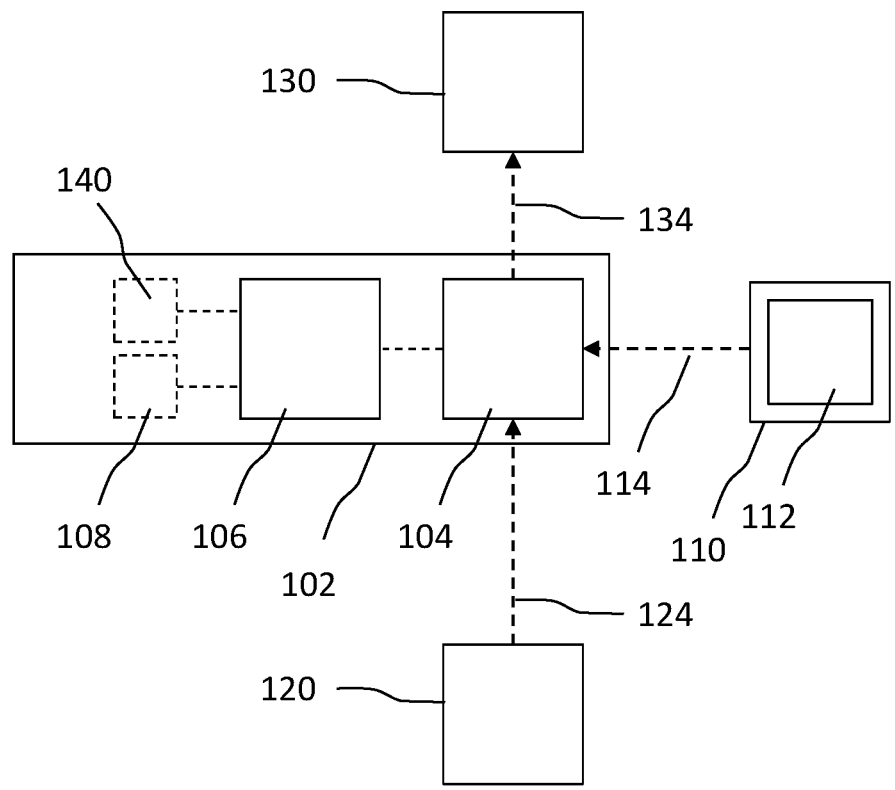
FIG. 1 shows schematically an embodiment of a system comprising a network controller for granting a device and/or an application access rights to at least one device of a set of devices.

FIG. 1 shows schematically an embodiment of a control system 100 comprising a network controller 102 for granting a device 120 and/or an application (which may be running on the device 120) access rights to at least one device of a set of devices 110, 130. The set of devices 110, 130 comprises a controllable device 130 and a control device 110, wherein the control device 110 comprises a user input element 112 configured to receive a user input. The control device 110 is configured to generate an input signal 114 based on the received user input. The network controller 102 comprises a communication unit 104 configured to receive an access request signal 124 from the device 120 and/or the application, and to receive the input signal 114 from the control device 110. The control device 110 further comprises a processor 106 (e.g. a microprocessor, circuitry, a microchip, etc.) configured to switch, upon receipt of the access request signal 124, the network controller 102 from a control mode to a configuration mode. The processor 106 is configured to control, if the network controller 102 is in the control mode, the controllable device 130 based on the input signal 114. The processor 106 is configured to grant, if the network controller 102 is in the configuration mode, the access rights to the device 120 and/or the application when the input signal 114 has been received. The access rights may provide access to control and/or configuration of at least one device of the set of devices.

The network controller 102 may be any type of device configured to provide access rights to new devices and/or new applications, such that the new devices/software applicants can control/configure one or more of a set of devices connected via a (wireless) network (e.g. a Wi-Fi network, a Zigbee network, a Bluetooth Mesh network, etc.). The network controller 102 may be a central controller, such as a bridge, a router, a central home controller, a gateway, etc. The network controller 102 may have access to a memory configured to store access data indicative of access rights of devices and applications. The processor 106 may be configured to grant the access rights to the device 110 and/or the application by updating the access data in the memory. The memory 108 may be located in the network controller 102, or the memory may be located remote from the network controller 102 and be accessible via a network and/or via the internet.

The network controller is configured for granting the device 102 and/or the application access rights to one or more of the set of devices. The set of devices comprises the controllable device 130 and the control device 110. These devices are part of the (wireless) network. The controllable device 130 may be any type of networked controllable device 130, such as a lighting device, a thermostat, an HVAC controller, a fan, a loudspeaker, a video rendering device, etc. The controllable device 130 may be a device configured to adjust an environmental parameter, such as the illumination, the temperature, the sound, etc. in an environment wherein the controllable device 130 is located.

The controllable device 130 comprises a communication unit (not shown) configured to receive control commands and a processing unit (not shown) configured to control the controllable device based on received control commands. The controllable device 130 may be configured to receive a control command (e.g. a lighting control command) from the network controller 102, and the control command may be based on the input signal 114 transmitted by the control device 112 to the network controller 102. Additionally or alternatively, the controllable device 130 may be configured to receive a control command (or the input signal indicative of the control command) directly from the control device 110.

The controllable device 130 may be a lighting unit comprising one or more light sources. The lighting unit may be an LED light bulb, an LED strip, a TLED, a light tile, etc. The lighting unit may comprise a control unit, such as a microcontroller (not shown), for controlling the light output generated by the one or more light sources (e.g. an LED light source) based on received lighting control commands. A lighting control command may comprise lighting control instructions for controlling the light output, such as the color, intensity, saturation, beam size, beam shape, etc. of the one or more light sources.

The control device 110 is configured to control the controllable device 130. The control device 110 comprises a user input element 112 configured to receive a user input, and a processing unit (not shown) configured to generate an input signal 114. The user input element 112 may, for example, be a push or touch button. The user input element 112 may, for example, be a touch-sensitive surface. Alternatively, the user input element 112 may be a gesture sensor (e.g. a camera, a distance sensor such as an ultrasound sensor, an RF sensor, etc.) configured to detect gestures (e.g. a waving motion of a user).

The network controller 102 comprises the communication unit 104 configured to receive the access request signal from the device 130 and/or the application, and to receive the input signal from the control device 110. The communication unit 104 may be configured to communicate via any wired or wireless communication protocol (e.g. Ethernet, DALI, Bluetooth, Wi-Fi, Li-Fi, Thread, ZigBee, etc.). The communication unit 104 may be configured to communicate with the control device 110, the new device 120 (which may be running the application) and the controllable device 130, either directly or indirectly. The communication unit 104 may be configured to communicate via multiple communication protocols, for example via Wi-Fi with the device and/or application 120, and via Zigbee and/or Bluetooth with the control device 110 and the controllable device 130. This may enable the network controller 102 to function as a bridge or gateway between the device 120 and the set of devices 110, 130. Additionally or alternatively, the control device 110 may be configured to communicate with the controllable device via a first protocol (e.g. via Zigbee), and the communication unit of the network controller 102 may be configured to communicate with the controllable device 130 via a second protocol (e.g. via Bluetooth).

The processor 106 may be configured to set the controllable device 130 into a configuration mode (when the processor 106 has been set to the configuration mode). When the controllable device 130 has been set to the configuration mode, it may receive the input signal from the control device 110 (e.g. via a first communication protocol) and communicate it to the network controller 102 (e.g. via a second communication protocol) to inform the processor 106 that the user has provided a user input at the user input element 112 of the control device 110.

The device 120 is configured to communicate the request signal to the network controller 102. The application may run on the device 120, or it may run on an external device (e.g. connected via the internet), and the application may generate the access request signal, whereupon the device that is running the application may communicate the access request signal to the network controller 102. The processor 106 of the network controller 102 is configured to switch, upon receipt of the access request signal, the network controller 102 from the control mode to the configuration mode.

The access request signal may, for example, be communicated to the network controller 102, when the device and/or the application 120 needs to connect to one or more devices of the set of devices. A connection may be required for controlling or configuring one or more of the set of devices 110, 130. Transmission of the request signal from the device and/or the application may be initiated by the application (which may be running on the device), or by a user operating the device/software 120. The controllable device 130 may, for example, be a lighting unit, and the device and/or the application 120 may request control of the lighting unit. The processor 106 of the network controller 102 may then provide the access rights to the device and/or the application 120.

In the control mode, the processor 106 controls the controllable device 130 based on the input signal 114. The processor 106 may, for example, transmit a control command 134 to the controllable device 130 based on the input signal 114. Alternatively, the processor 106 may be configured to instruct the control device 110 (e.g. by communicating an instruction signal to the control device 110) to communicate a control command (not shown) to the controllable device 130. When the network controller 102 is switched to the configuration mode, the processor 106 of the network controller 102 may instruct the control device 110 (e.g. by communicating an instruction signal to the control device 110) to communicate the input signal to the network controller 102 (instead of a control command to the controllable device 130).

In the configuration mode, the processor 106 grants the access rights to the device and/or the application when the input signal 114 has been received. Thus, a user may provide the user input at the input element 112 of the control device 110 to grant the access rights to the new device and/or application 120 via the same input element 112 that is (normally) used for controlling the controllable device 130. The processor 106 may grant the access rights by, for example, updating the access data in the memory 108. When in the configuration mode, the processor 106 may refrain from controlling the controllable device based on the input signal.

Additionally or alternatively, the processor 106 may grant the access rights to the new device and/or application 120 by, for example, communicating a response signal to the device and/or the application 120. The response signal may comprise information indicative of that the access rights have been granted to the device and/or the application 120. Additionally or alternatively, the response signal may comprise an access key and/or address information of the network device 102 and/or one or more of the set of devices 110, 130. The access key and/or address information may enable the new device and/or the application 120 to access the network controller 102 and/or the one or more of the set of devices 110, 130, respectively. The processor may communicate the response signal via the communication unit 104.

The processor 106 may be further configured to switch the network controller 102 back to the control mode after the input signal 114 has been received from the control device 110, or after the access rights have been granted to the device 120.

The network controller may comprise a second user interface 140 co-located with the network controller comprising a second user input element configured to receive a second user input. The processor 106 of the network controller 106 may be further configured to grant the device and/or the application 120 the access rights upon receiving the second user input.

The processor 106 may be configured to switch back to the control mode for a predetermined period of time. The duration of the predetermined period of time may be pre-defined, user-defined, defined by the device and/or application 120, defined by the network controller 102, etc. The duration may be selected based on the intended use of the network controller. For instance, in a system 100 installed in a larger building, the duration may be longer compared to a system 100 installed in a smaller building. The predetermined period of time may have a duration (e.g. 10 seconds, 30 seconds, etc.) that enables a user to move towards the control device 110 and provide the user input.

Figure 2:
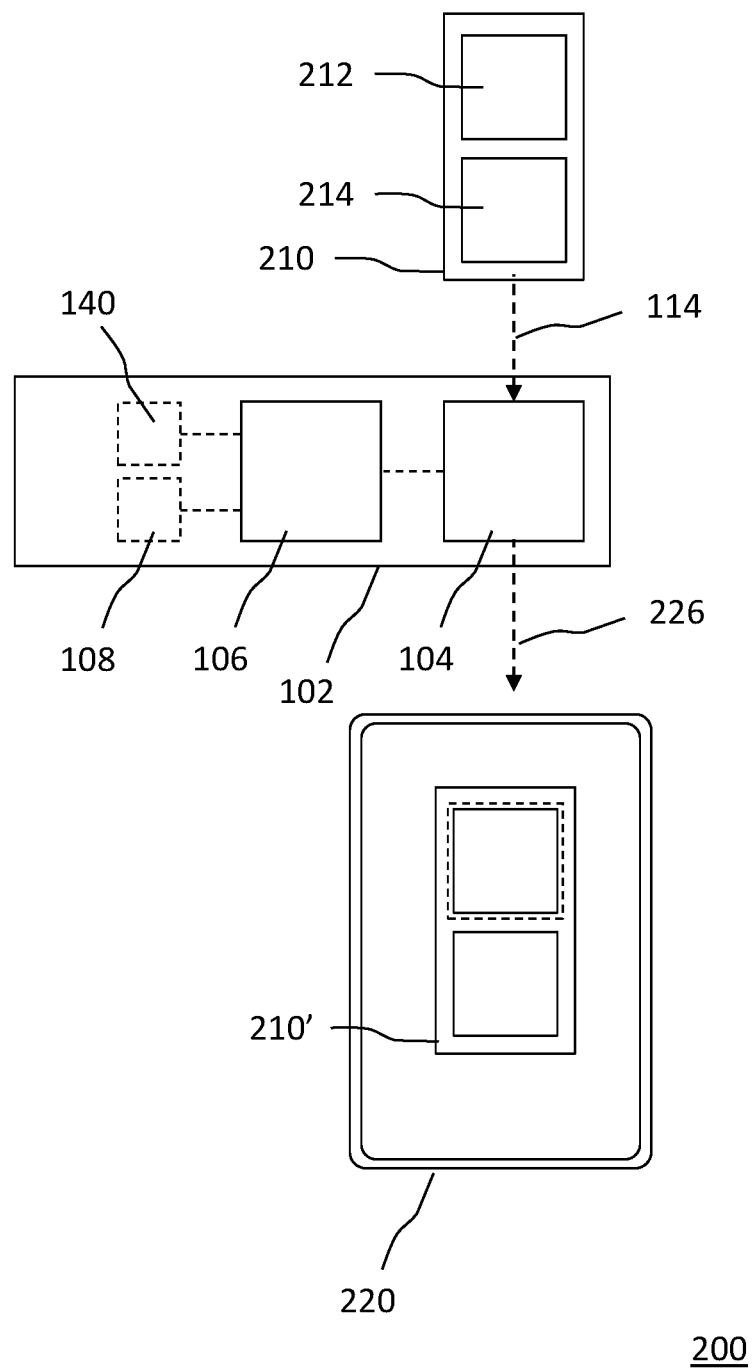
FIG. 2 shows schematically an embodiment of the system of FIG. 1 comprising a device with a user interface.

The control device 110 may comprise a further user input element configured to receive a further user input. This has been illustrated in FIG. 2, which shows a system 200 comprising a control device 210 comprising a (first) input element 212 and a further input element 214. The control device 210 may be configured to generate a further input signal based on the received further user input. The communication unit 104 of the network controller 102 may be configured to receive the further input signal, and the processor 106 may be configured to control, if the network controller is in the control mode, the controllable device 130 (not shown in FIG. 2) based on the further input signal. The processor 106 may be configured to grant, if the network controller 102 is in the configuration mode, the access rights to the device and/or the application 120, 220 when the further input signal has been received. The user may therefore provide an input at either the input element 212 or the further input element 214 to provide the access rights to the device and/or the application 120, 220. Alternatively, the processor 106 may be configured to provide the access rights to the device and/or the application 120, 220 only if the input signal has been generated when the (first) input element 212 has been actuated, and to control the controllable device 130 when the further user input element 214 has been actuated. An example of a user interface has been illustrated in FIG. 2, which illustrates a virtual representation 210' of the control device 210. FIG. 2 further illustrates that the user input to provide the access rights should be provided by actuating the (first) user input element 212.

The processor 106 may be further configured to switch to the configuration mode when a plurality of input signals are received within a predetermined time period. The user may, for example, be required to provide a double press on a button of the control device 110. Alternatively, the input signal may be indicative of that the user has provided a plurality of inputs at the user input element 112, and the processor 106 may be configured to switch to the configuration mode only when the input signal is indicative of that the user has provided a plurality of inputs at the user input element 112 (e.g. a plurality of button presses within a predetermined period of time).

The device 120, 220 may comprise a user interface configured to provide a notification to indicate that the access rights have been granted to the device and/or the application. Additionally or alternatively, the user interface may be configured to provide a notification to notify a user that the control device 120, 220 has been set to receive the user input for obtaining the access rights. The notification(s) may, for example, be an audio notification (e.g. a sound), a tactile notification (e.g. a vibration), a visual notification (e.g. rendered on a display), etc.

Figure 3:
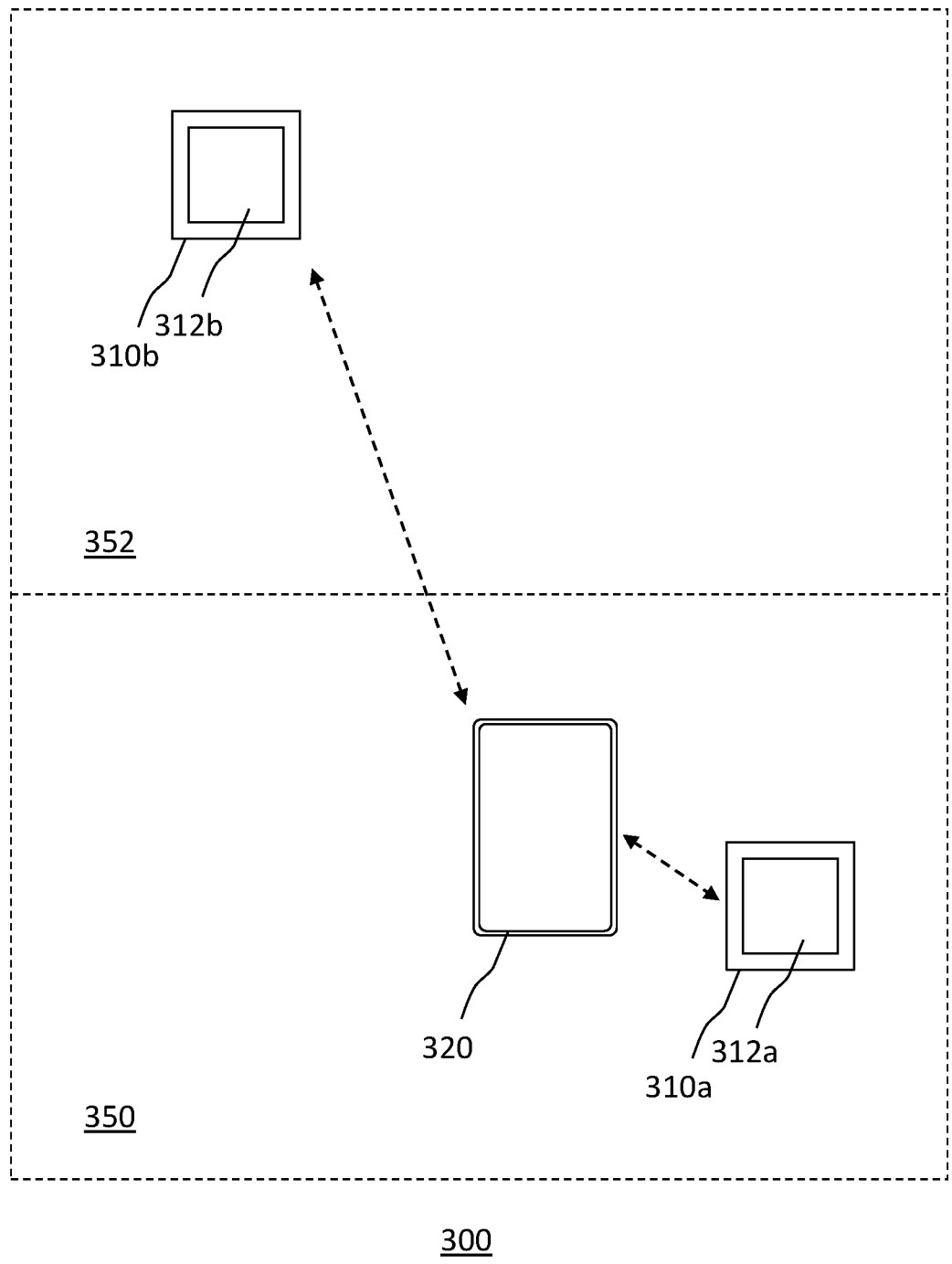
FIG. 3 shows schematically an embodiment of a system for determining a location of a device relative to a plurality of control devices.

The set of devices may comprise a plurality of control devices, and the processor 106 may be configured to obtain information indicative of locations of the plurality of control devices relative to a location of a user requesting the access rights for the device and/or the application 120. The processor 106 may be further configured to switch to the configuration mode for input signals received from a first control device and to stay in the operation mode for input signals received from a second control device based on the locations of the first and second control devices relative to the location of the user. The locations of the plurality of control devices relative to the user may be obtained in in different ways, as will be illustrated by the next examples referring to FIG. 3, which illustrates a system 300 comprising a device 320 that requests the access rights, a first control device 310a comprising a first input element 312a and a second control device 310b comprising a second input element 312b. In a first example, the location of the user relative to the first and second control devices 310a, 310b may be determined based on location information received from an indoor positioning system. The indoor positioning system may determine the locations of the control devices 310a, 310b and the device 320 which may be operated by the user. In another example, the control devices 310a, 310b may have been assigned to respective areas 350, 352 (e.g. a living room and a kitchen) in a space, and the information about the area wherein the device 320 is located may be obtained by the processor 106 (e.g. from an indoor positioning system, from a user, from a home control system, etc.).

Figure 4:
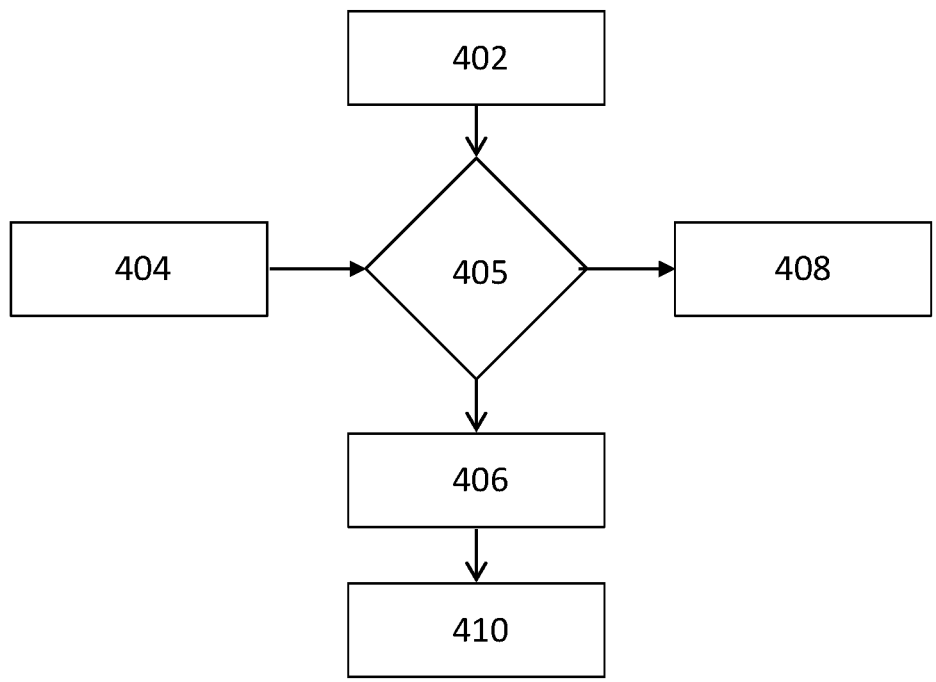
FIG. 4 shows schematically a method for granting a device and/or an application access rights to at least one device of a set of devices via a network controller.

FIG. 4 shows schematically a method 400 for granting a device and/or an application access rights to at least one device of a set of devices via a network controller. The set of devices comprises a controllable device and a control device, wherein the control device comprises a user input element configured to receive a user input, and wherein the control device is configured to generate an input signal based on the received user input. The method 400 comprises:

receiving 402 the input signal from the control device,
receiving 404 an access request signal from the device and/or the application,
switching 406, upon receipt of the access request signal, the network controller from a control mode to a configuration mode,
controlling 408, if the network controller is in the control mode, the controllable device based on the input signal, and
granting 410, if the network controller is in the configuration mode, the access rights to the device and/or the application upon receipt of the input signal.

The method 400 may further comprise the step of determining 405 whether the network controller is in the control mode or in the configuration mode.

The method 400 may be executed by computer program code of a computer program product when the computer program product is run on a processing unit of a computing device, such as the processor 106 of the network controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A network controller for granting a device and/or an application access rights to at least one device of a set of devices, wherein the set of devices comprises a controllable device and a control device, wherein the control device comprises a user input element configured to receive a user input, and wherein the control device is configured to generate an input signal based on the received user input, wherein the network controller comprises:

a communication unit configured to receive an access request signal from the device and/or the application, and to receive the input signal from the control device, and a processor configured to switch the network controller from a limited control mode to a broader configuration mode upon receipt of the access request signal, wherein the processor is configured to control the controllable device based on the input signal if the network controller is in the limited control mode, control of the controllable device being limited to the processor when in the limited control mode, wherein the processor is configured to grant the access rights to the device and/or the application upon receipt of the input signal if the network controller is in the broader configuration mode, and the access rights are configured to provide access to control and/or configuration of at least one device of the set of devices, and wherein based on the input signal, the processor is configured to refrain from controlling the device in the broader configuration mode.

2. The network controller of claim 1, wherein the network controller comprises a second user input element configured to receive a second user input, and wherein the network controller is configured to grant the device and/or the application the access rights upon receiving the second user input.

3. The network controller of claim 1, wherein the processor is further configured to transmit, when the network controller is in the limited control mode, a control command to the controllable device based on the input signal.

4. The network controller of claim 1, wherein the processor is configured to switch back to the limited control mode after a predetermined period of time.

5. The network controller of claim 1, wherein the processor is further configured to switch the network controller back to the limited control mode after the input signal has been received, or after the access rights have been granted.

6. The network controller of claim 1, wherein the processor is further configured to communicate a response signal to the device and/or the application, wherein the response signal comprises information indicative of that the access rights have been granted.

7. The network controller of claim 1, wherein the processor is further configured to access a memory configured to store access data indicative of access rights of devices and applications, and wherein the processor is configured to grant the access rights to the device and/or the application by updating the access data in the memory.

8. The network controller of claim 1, wherein the control device comprises a further user input element configured to receive a further user input, and wherein the control device is configured to generate a further input signal based on the received further user input, and wherein the communication unit is configured to receive the further input signal, wherein the processor is configured to control, if the network controller is in the limited control mode, the controllable device based on the further input signal, and wherein the processor is configured to grant, if the network controller is in the broader configuration mode, the access rights to the device and/or the application when the further input signal has been received.

9. The network controller of claim 1, wherein the set of devices comprises a plurality of control devices, wherein the processor is configured to obtain information indicative of locations of the plurality of control devices relative to a location of a user requesting the access rights for the device and/or the application, and wherein the processor is configured to switch to the broader configuration mode for input signals received from a first control device and to stay in the operation mode for input signals received from a second control device based on the locations of the first and second control devices relative to the location of the user.

10. The network controller of claim 1, wherein the controllable device is a lighting device and wherein the application is a lighting control application.

11. A control system comprising:
the network controller of claim 1,
the control device comprising the user input element configured to receive the user input, and
the controllable device configured to be controlled based on the input signal.

12. A method for granting a device and/or an application access rights to at least one device of a set of devices via a network controller, wherein the set of devices comprises a controllable device and a control device, wherein the control device comprises a user input element configured to receive a user input, and wherein the control device is configured to generate an input signal based on the received user input, wherein the method comprises:
receiving, by a processor, the input signal from the control device,
receiving, by the processor, an access request signal from the device and/or the application,
switching, by the processor, the network controller from a limited control mode to a broader configuration mode upon receipt of the access request signal,
controlling, by the processor, the controllable device based on the input signal if the network controller is in the limited control mode, control of the controllable device being limited to the processor when in the limited control mode, and
granting, by the processor, the access rights to the device and/or the application upon receipt of the input signal if the network controller is in the broader configuration mode, wherein the access rights provide access to control and/or configuration of at least one device of the set of devices, and wherein based on the input signal, the processor is configured to refrain from controlling the device in the broader configuration mode.

13. The method of claim 12, further comprising:
providing, via a user interface, a notification to indicate that the access rights have been granted to the device and/or the application.

14. The method of claim 12, further comprising:
providing, via a user interface, a notification to notify a user that the control device is set to receive the user input for obtaining the access rights.

15. A non-transitory computer readable medium comprising computer executable instructions that, when executed, perform at least the method as defined in of claim 12.

* * * * *